Patented Nov. 11, 1941

2,262,092

UNITED STATES PATENT OFFICE 2,262,092

COATING COMPOSITION AND METHOD OF MAKING THE SAME

Malcolm R. Buffington, Millburn, N. J.

No Drawing. Application January 18, 1938, Serial No. 185,511

10 Claims. (Cl. 260—738)

This invention relates to a composition particularly adapted for use to form a protective coating.

An object of the invention is to provide a solution which can be applied by brushing, dipping or spraying on wood, concrete and various metals to deposit a film which on drying is highly resistant to corrosion, thereby protecting the material to which it is applied.

Another object of the invention is to provide a coating in the form of a solution which may be applied to cloth, paper, leather or other materials to deposit a film which when dried is very flexible and resistant to most oils and chemicals. The flexibility of this film may be varied at will to suit any given requirements without decreasing the corrosion resistance thereof.

Another object of the invention is to provide a flexible oil and chemical proof coating which has high electrical insulating value in the presence of moisture, for use in coating plain or cotton covered electrical wires.

Another object of the invention is to provide a paint for use on ocean going vessels which is fire resistant and highly resistant to corrosion caused by salt air.

Another object of the invention is to introduce rust inhibiting and other inert pigments into a compounded paint solution by masticating with synthetic rubber before solution thereby coating the pigment particles with an envelope of flexible, chemical proof material.

Still another object of the invention is to provide a paint compound of synthetic rubber and other chemical proof materials which can be applied to the inside of tanks or other vessels and the synthetic rubber content vulcanized in situ by the introduction of steam or hot water, thereby accelerating the hardening of the coating.

Many materials have been suggested and used in paints designed to protect structural materials against corrosion. Some of these paints are useful in protecting against a particular type of corrosion but fail entirely when exposed to other types. Oil proof paints are often adversely affected by moisture or chemicals while paints which are reasonably resistant to chemicals are often dissolved completely by oils or the plasticizers are dissolved out leaving a brittle film.

Difficulty has also been experienced in formulating paints and protective coatings which would be sufficiently elastic to withstand the expansion and contraction of the materials coated without cracking.

One material which has been used to a great extent in formulating corrosion resistant paints, is chlorinated rubber. One of the types of chlorinated rubber commercially available is sold under the trade name of "Tornesit" and contains from about 65 to 68 percent of chlorine.

Chlorinated rubber is in itself, very resistant to chemical corrosion. However, when it is dissolved in a suitable solvent, the film deposited from the solution is very brittle. In order for it to be of use as a coating material it must be plasticized.

A number of plasticizers have been used in chlorinated rubber paints. The difficulty with those ordinarily used is that they are not as resistant to chemicals as the chlorinated rubber itself. Continued contact with corrosive agencies causes these plasticizers to break down and the film becomes brittle.

Chlorinated rubber paints must also be pigmented in order to increase the body and give opacity to the film. The pigments must be ground to a paste in some medium so that they may be dispersed properly in the paint solution. It is usually impossible to carry enough plasticizer in chlorinated rubber paints to grind the required amount of pigment and it becomes necessary to grind it in a part or all of the chlorinated rubber solution.

Since most of the plasticizers used in chlorinated rubber paints are soluble in the solvent, the addition of the pigments ground in such plasticizers merely results in the suspension of the pigment and the pigment only serves its purpose in proportion to the fineness of grinding.

This invention discloses the fact that by using an elastic material such as synthetic rubber as a plasticizer for chlorinated rubber in suitable solvents, a coating material is obtained which has many new and useful applications. The synthetic rubber found to be most useful is commercially available as neoprene and is chemically known as a polymer of chloroprene or 2 chloro 1,3 butadiene.

It is not at all surprising to find that polymerized chloroprene and chlorinated rubber are similar with respect to resistance to oils and chemical corrosion. It is generally conceded that natural rubber is a polymer of isoprene and that chloroprene is similar in structure to isoprene with the exception of replacement of one hydrogen atom with chlorine. Apparently when natural rubber is treated with chlorine a replacement of hydrogen occurs but the chlorine enters in a different position in the structural formula which probably accounts for the difference in physical properties; polymerized chloroprene is quite elastic while chlorinated rubber in the dry state is a fluffy, granular powder.

The resistance of synthetic rubber to heat, oxidation, oils and chemical solutions is well known. With regard to chemical corrosion, its resistance is equal to or better than that of chlorinated rubber.

It is a well known fact that almost any desired pigment may be mixed into synthetic rubber on a roll mill and if vulcanizing agents are added and the product vulcanized, an elastic material of high tensile strength is obtained. Such compounds can also be dissolved in suitable solvents and the film deposited after evaporation of the solvent has all of the characteristics of the undissolved compound.

In mixing pigments into synthetic rubber by mastication the pigment particles become coated with a film of synthetic rubber. This film persists in solution and when added to a solution of chlorinated rubber the pigment remains coated with an elastic film from the time of admixture until deposited by evaporation of the solvent. It is obvious that pigments added in this manner could be much larger in particle size and still be less exposed to weathering and corrosive influences than pigments which were ground fine in a medium less able to form a protective film around the particles, strong enough to keep the particle coated until the time of deposition.

As an example of a satisfactory synthetic rubber compound suitable for plasticizing and pigmenting a chlorinated rubber solution, the following is given as an example of the present invention:

| | |
|---|---|
| Polymerized chloroprene | 100 |
| Carbon black | 100 |
| Magnesium oxide | 10 |
| Zinc oxide | 10 |
| Softener | 10 |
| Rosin | 5 |
| Antioxidant | 2 |
| Sulphur | 1 |

In the above composition the magnesium oxide, zinc oxide and sulphur are vulcanizing agents. The softener aids in the incorporation of pigments on the mixing mill. The rosin is a stabilizer and the antioxidant is a protective agent against heat and oxidation. The carbon black present in the mix toughens the product and also acts as a filler and a coloring agent. Equivalents for these ingredients which are well known to those familiar with the art of compounding synthetic rubber may be used. For example, the magnesium and zinc oxides may be replaced by litharge to give a product which is much more resistant to water absorption. The carbon black may be replaced by any number of pigments such as iron oxide, graphite, silica, red lead, titanium dioxide, zinc chromate, aluminum powder, barium sulphate, or whiting. In most cases, the pigments which do not absorb water easily are desirable, although for oil resistance almost any pigment mentioned is satisfactory.

In making a paint composed of chlorinated rubber and a synthetic rubber compound similar to the example given, a preferred method is to make a solution of the chlorinated rubber in a solvent such as xylol and dissolve the synthetic rubber compound in this solution.

The following is an example of a paint which has been found to be an excellent protective coating for equipment used in the oil fields where acid is present in the fluid:

| | Pounds |
|---|---|
| Synthetic rubber compound, as polymerized chloroprene | 15 |
| Chlorinated rubber | 15 |
| Xylol | 70 |

The film deposited from this solution is flexible, tough, and has good adhesion on metal.

The flexibility of the paint film may be varied by reducing the amount of pigment in the synthetic rubber compound and using the same ratio to chlorinated rubber in solution, or a greater amount of synthetic rubber compound can be used with a lesser amount of chlorinated rubber. It will be readily understood by those familiar with the art that the possibilities of compounding are almost unlimited and that many variations of the examples given may be made without departing from the spirit of the invention.

As stated elsewhere in this specification, litharge may be used as a vulcanizing agent for the synthetic rubber compound where it is necessary to provide a film having very low water absorption. An example of such a compound is as follows:

| | |
|---|---|
| Polymerized chloroprene | 100 |
| Carbon black | 100 |
| Softener | 5 |
| Rosin | 5 |
| Litharge | 20 |
| Antioxidant | 2 |
| Sulphur | 1 |

A 30% solution of equal parts of this compound and chlorinated rubber in xylol gives a paint which is suitable for the lining of containers carrying greases, coating of underground pipe lines carrying petroleum, or other uses where it is necessary to resist moisture and oil at the same time.

In some cases where resistance to oil is not a factor, the adhesion of the coating as well as its resistance to moisture may be improved by the addition of a high molecular weight resin derived from the polymerization of solvent naphtha. Resins of this type are commercially available as "Nevillite" and "R. H. #35."

As an example of a paint formula which would be suitable for use in painting structural work and equipment in chemical plants where resistance to oil is not important, the following is given:

| | Pounds |
|---|---|
| Synthetic rubber compound, as polymerized chloroprene, containing litharge | 10 |
| Chlorinated rubber | 10 |
| R. H. #35 resin | 10 |
| Xylol | 70 |

This invention is not limited to the production of paint films, but may also be used as a bonding medium between metal, wood or concrete and a layer of resilient synthetic rubber. As an example of the use of this invention in lining tanks or chutes with synthetic rubber compound, the following is given:

The object to be lined is coated with a prime coat of No. 1.

| | |
|---|---|
| Synthetic rubber compound, polymerized chloroprene | 10 |
| Chlorinated rubber | 10 |
| R. H. #35 resin | 10 |
| Xylol | 70 |

The prime coat is followed with a coat of No. 2.

| | |
|---|---|
| Synthetic rubber compound, polymerized chloroprene | 20 |
| R. H. resin #35 | 8 |
| Chlorinated rubber | 2 |
| Toluol | 70 |

A sheet of synthetic rubber compound is then coated with #2, attached to the prepared surface while tacky and rolled into contact. The synthetic rubber coating may then be vulcanized by steam, hot air, or hot water. If so desired, the resilient coating of synthetic rubber compound may be applied on top of the bonding coats in the form of a solvent cement. This method is also applicable to the covering of wood or metal rolls with synthetic rubber compound.

Another valuable property of films produced from the paints herein described, is their resistance to fire. They do not support combustion and do not blister even when the flame of a Bunsen burner is directed against them.

The uses of coating produced by the combination of synthetic rubber and chlorinated rubber are numerous. They may be used to coat tanks, pipes, machinery, fans, etc., in chemical plants; in the oil fields to coat equipment such as pumps, working barrels, sucker rods, pipes, and tanks, either underground or above the surface; to coat bare or cotton covered electrical wires for insulation, and also as a flame resisting compound; on steamships as a flame proofing compound and a paint to resist corrosion by salt air; in textile mills to coat rolls and other equipment used in the drafting of textile fibers to reduce the generation of static electricity; on structural steel supporting bridges subject to the corrosive action of gases from locomotives; as a lining for drums, cans and other containers used in the transportation of chemicals such as ammonium salts, soda ash, bleaching powder, etc.

It is to be understood that this invention is not limited to the particular ingredients and proportions given in this specification, or merely to such examples as have been given herein by way of illustration, it being readily understood by those familiar with the art that said ingredients, components and proportions may be varied within comparatively wide limits without departing from the purposes and principles of the invention herein set forth.

It is further understood that this invention is not to be construed as dependent on the accuracy or soundness of any of the chemical theories herein expressed, which are merely set forth as explanatory—so far as is known—of the reactions and combinations that produce the novel and useful compositions herein disclosed.

What is claimed is:

1. A paint material resistant to water, oils and chemicals comprising polymerized chloroprene and chlorinated rubber in an organic solvent in admixture suitable for painting.

2. A vulcanizable paint material resistant to water, oils and chemicals and having a high degree of flexibility comprising a mixture of polymerized chloroprene, chlorinated rubber, a vulcanizing agent and an organic solvent admixed therewith in suitable proportion for painting.

3. A fire resistant, vulcanizable paint material resistant to water, oils and chemicals and having a high degree of flexibility, adhesion and toughness comprising polymerized chloroprene, chlorinated rubber, a resin, a vulcanizing agent and an organic solvent therefor in proportion to provide suitable consistency for painting.

4. A fire resistant vulcanizable paint material having high electrical resistance, flexibility, adhesion and toughness when applied as a film, comprising a mixture of polymerized 2 chloro, 1,3 butadiene and chlorinated rubber in substantially equal parts in solution in a volatile organic solvent in proportion for the production of paint films.

5. A fire resistant vulcanizable paint material having high electrical resistance, flexibility, adhesion and toughness when applied as a film, and being resistant to water, oils and chemicals comprising substantially a 30% solution of equal parts of chlorinated rubber and a compound consisting mainly of polymerized chloroprene, carbon black and a vulcanizing agent, said equal parts being dissolved in a benzene derivative having at least one hydrogen of the nucleus replaced by a methyl group.

6. A vulcanizable paint material resistant to water, oils and chemicals and having a high degree of flexibility comprising a mixture of polymerized 2 chloro 1,3 butadiene and chlorinated rubber dissolved in xylol so as to form substantially a 30% solution thereof.

7. A corrosion resisting paint material adapted for coating metal surfaces to contact with aqueous rubber dispersion without causing precipitation or coagulation of the rubber therein, and when dried having sufficient elasticity to withstand expansion and contraction with changes in temperature without cracking which comprises chlorinated rubber containing from about 65 to 68 per cent of chlorine, a synthetic rubber of polymerized chloroprene as a plasticizer therefor and a solvent material as a paint vehicle therefor.

8. A corrosion resisting paint material particularly adapted for coating the interior portions of metal confining walls for retaining aqueous rubber dispersion to render the said walls unreactive to the said dispersion and prevent precipitation or coagulation of rubber therein which comprises an admixture of chlorinated natural rubber and a polymerized chloroprene together with a vehicle, the said chlorinated natural rubber being in sufficient proportion in said admixture to render the coating flexible and to prevent the development of cracks in the said coating and the said polymerized chloroprene being in sufficient proportion to provide resistance of the coating to heat, oxidation and corrosion through the combined effects of the components.

9. A corrosion-resisting coating composition comprising polymerized chloroprene and chlorinated rubber.

10. A fire-resistant, vulcanizable paint material adapted for brushing, dipping or spraying on a surface to form a film having high electrical resistance, flexibility, adhesion and toughness, resistance to corrosion of the underlying surface by salt air, water, oils and chemicals, comprising a mixture of polymerized chloroprene, chlorinated rubber, a vulcanizing agent, a pigment and an organic solvent adapted to evaporate upon application of the said mixture to provide a dry film.

MALCOLM R. BUFFINGTON.